Sept. 9, 1969  R. HENNECKE ET AL  3,465,599
MECHANISM FOR VARYING THE PHASE RELATION OF
TWO ECCENTRIC WEIGHTS Filed May 22, 1968  2 Sheets-Sheet 1

INVENTORS
Rudolf Hennecke
Arthur Brander
Eugen Georgi
BY
Watson, Cole, Grindle & Watson
ATTORNEYS

United States Patent Office 3,465,599
Patented Sept. 9, 1969

3,465,599
MECHANISM FOR VARYING THE PHASE RELATION OF TWO ECCENTRIC WEIGHTS
Rudolf Hennecke, 106 Staufenstrasse, 7067 Buoch, near Waiblingen, Germany; Arthur Brander, 15 Morikestrasse, 7311 Bunzwangen, Germany; and Eugen Georgi, 119 Urbanstrasse, 7300 Esslingen, Germany
Filed May 22, 1968, Ser. No. 731,184
Claims priority, application Germany, May 27, 1967, D 53,184
Int. Cl. F16h 33/14
U.S. Cl. 74—61                                                9 Claims

ABSTRACT OF THE DISCLOSURE

A very simple mechanism for infinitely varying the phase relation of two revolving eccentric weights which are driven in opposite directions to each other by an endless chain or the like which also runs over two reversing wheels which are movable for equal distances in opposite directions so as to increase the length of one stringer of the chain intermediate the wheels carrying the eccentric weights and simultaneously to decrease the length of the other stringer.

---

The present invention relates to a mechanism, especially for a jarring machine, for infinitely varying the phase relation of two eccentric weights which are mounted on two separate shafts and are to be driven in opposite directions to each other, and which are positively connected to each other by a gearing which comprises a flexible endless power transmitting element which runs over at least two reversing wheels and has a fixed total length, while its length between its points of engagement with the two drive wheels of the eccentric weights may be varied at will within predetermined limits by changing the position of at least one reversing wheel over which the transmitting element is traveling, while the position of the other reversing wheel or wheels is determined by the position of the first reversing wheel.

It is an object of the present invention to provide a very simple and reliable mechanism of the above-mentioned type for varying the phase relation of two revolving eccentric weights. Another object of the invention is to provide such a mechanism which requires very little space and is very sturdy and especially adapted for being employed in a jarring machine. A further object of the invention is to provide such a mechanism which requires only one gear or no gear at all for varying the phase relation of the two eccentric weights.

According to the invention, these objects are attained by mounting the eccentric weights on two drive wheels with parallel axes, by providing two reversing wheels in variable positions at both sides of the plane connecting the axes of the drive wheels and at a shorter distance from a first of the drive wheels than from the other drive wheel by connecting the two drive wheels by means of a flexible endless power transmitting element such as a chain which when driven drives the two drive wheels and the eccentric weights thereon in opposite directions by passing back and forth over the two reversing wheels and the intermediate first drive drive wheel so that the opposite sides of the transmitting element forming two loops parallel to each other engage upon the same side of both drive wheels opposite to the side upon which it engages on the reversing wheels, and by providing suitable means for moving the two reversing wheels for equal distances in directions opposite to each other and symmetrically to the plane connecting the axes of the two drive wheels. Therefore, when one of the reversing wheels is moved for a certain distance away from the first drive wheel, the other reversing wheel is moved simultaneously for an equal distance toward the same drive wheel. The length of one stringer of the transmitting element connecting one drive wheel via one reversing wheel to the other drive wheel is then incerased, while the length of the other stringer connecting the drive wheels via the other reversing wheel is equally reduced. Consequently, when a transmitting element of the proper length has once been installed in the mechanism, its operation does not require any means for tightening this element, although such means may be desirable for facilitating the adjustment of this element and for compensating for its expansion due to prolonged use.

The means for adjusting the two reversing wheels may be of a very simple and inexpensive design. Thus, for example, according to one embodiment of the invention they may consist of a gear wheel the diametrically opposite sides of which are in mesh with a pair of parallel racks which are slidably mounted and on which the reversing wheels are rotatably mounted. By turning this gear wheel about its axis, the two racks and the reversing wheels thereon will be shifted equally in opposite directions to each other. According to another embodiment of the invention, the adjusting means may simply consist of a two-armed lever which is pivotably mounted at its center in a fixed position and carries the two reversing wheels on its opposite ends. A longitudinally adjustable connecting rod or similar means which is connected to one end of this lever may then be used for pivoting the lever together with the reversing wheels to any desired angle in either direction.

A further embodiment of the invention which is especially adapted to be employed in a jarring machine and to bear up under the rough operation of such a machine consists in rotatably connecting the two reversing wheels to a two-armed lever and in providing suitable means for mounting and guiding each reversing wheel so that its axis is movable along an arc which is homologous to the arc along which the axis of the other reversing wheel is movable and on which arcs both reversing wheels are always equally spaced from the pivot axis of the two-armed lever in any position to which this lever is pivoted. The two-armed lever may be pivotably mounted in a very simply manner and it may be pivoted by very simple means to any desired angular position which also determines the position of the axes of the two reversing wheels.

Another feature of the invention consists in rotatably mounting the reversing wheels on one-armed levers and in slidably guiding them in slots in the opposite ends of the two-armed lever. The pivot axes of the one-armed levers and of the two-armed lever should then be disposed within a common plane which extends at right angles to the plane which intersects the axes of the two drive wheels carrying the eccentric weights. The one-armed levers may then be pivotably mounted directly on a housing of the mechanism. Therefore, if means are provided for adjusting the position of the pivot axis of the two-armed lever in alignment with the axes of the two drive wheels, the one-armed levers are independent of these adjusting means. The most suitable arrangement of the different axes has been found to be that the axes of the reversing wheels are located between the axis of the two-armed lever and the axis of the one-armed lever carrying one of the reversing wheels.

The features and advantages of the present invention will become further apparent from the following detailed description thereof which is to be read with reference to the accompanying diagrammatic drawings, in which—

FIGURE 3 is a diagrammatic illustration of a mechanism according to the second embodiment of the invention, while

Figure 1:
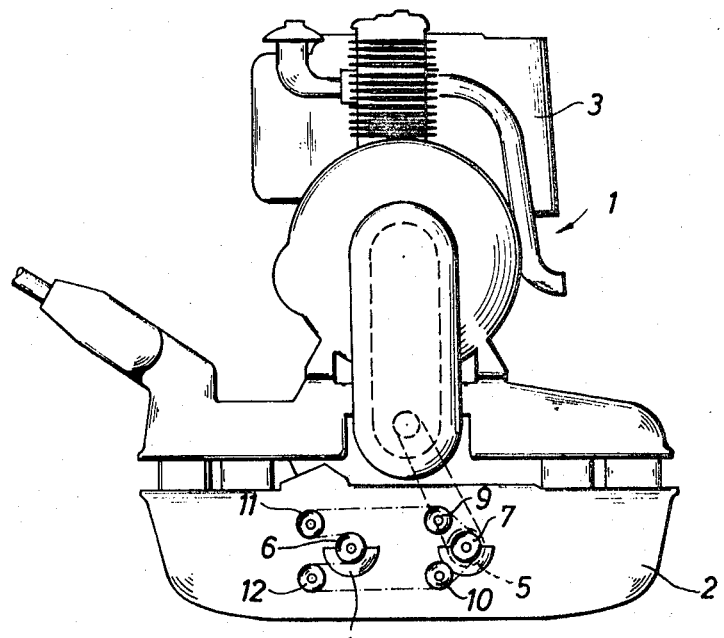
FIGURE 1 shows a side view of a jarring machine which is provided with a mechanism according to the invention.

As illustrated in FIGURE 1, a jarring machine 1 comprises a compressing plate 2 on which a motor 3 is resiliently mounted which is adapted to drive two eccentric weight members 4 and 5 which are mounted on parallel shafts and are rotatable in opposite directions to each other. As indicated in dotted lines in FIGURE 1, the driving power of motor 3 is directly transmitted to only one of the eccentric weight members 4 and 5.

Figure 2:
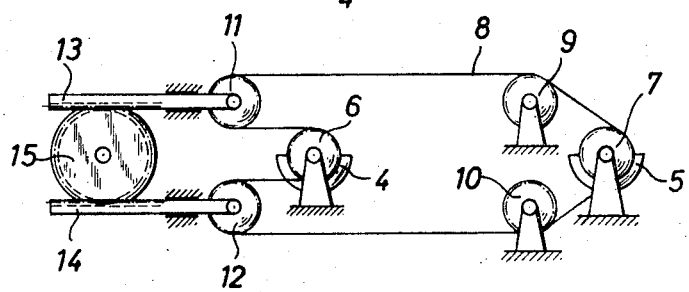
FIGURE 2 is a diagrammatic illustration of the mechanism according to FIGURE 1, but on a larger scale.

As shown more clearly in FIGURE 2, the shafts carrying the eccentric members 4 and 5 also carry sprocket wheels 6 and 7 around which a chain 8 is looped in a manner so that the sprocket wheel 6 engages with one side and sprocket wheel 7 with the opposite side of chain 8 and the two sprocket wheels are therefore driven in opposite directions to each other.

Between the sprocket wheels 4 and 5, chain 8 travels over guide wheels 9 and 10 which are mounted in a fixed position and over reversing wheels 11 and 12 which are mounted on movable means, for example, on racks 13 and 14 which may be shifted in directions parallel to each other and by means of a gear wheel 15 which meshes with the racks 13 and 14. Since the two reversing wheels 11 and 12 may be shifted parallel to each other, no chain tightener is ordinarily required for the chain 8, provided the chain is originally made of the proper length and is of a quality so as to maintain its length for a long time.

When the adjusting wheel 15 is turned about its axis, the two reversing wheels 11 and 12 will be shifted equally in opposite directions to each other, whereby the length of one stringer of the chain between the sprocket wheels 6 and 7 will be increased to the same extent as the length of the other stringer will be reduced and sprocket wheel 6 will be turned acuordingly relative to sprocket wheel 7. This results in a corresponding change in the phase relationship between the eccentric members 4 and 5.

Figure 3:
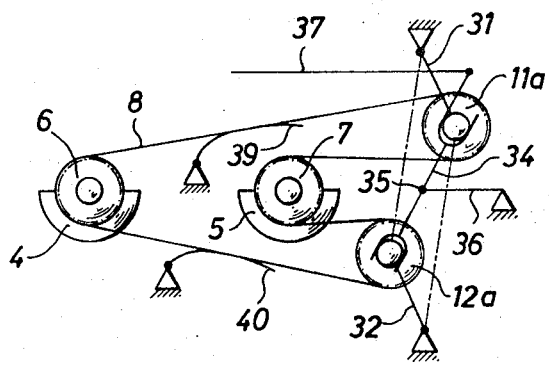
Figure 4:
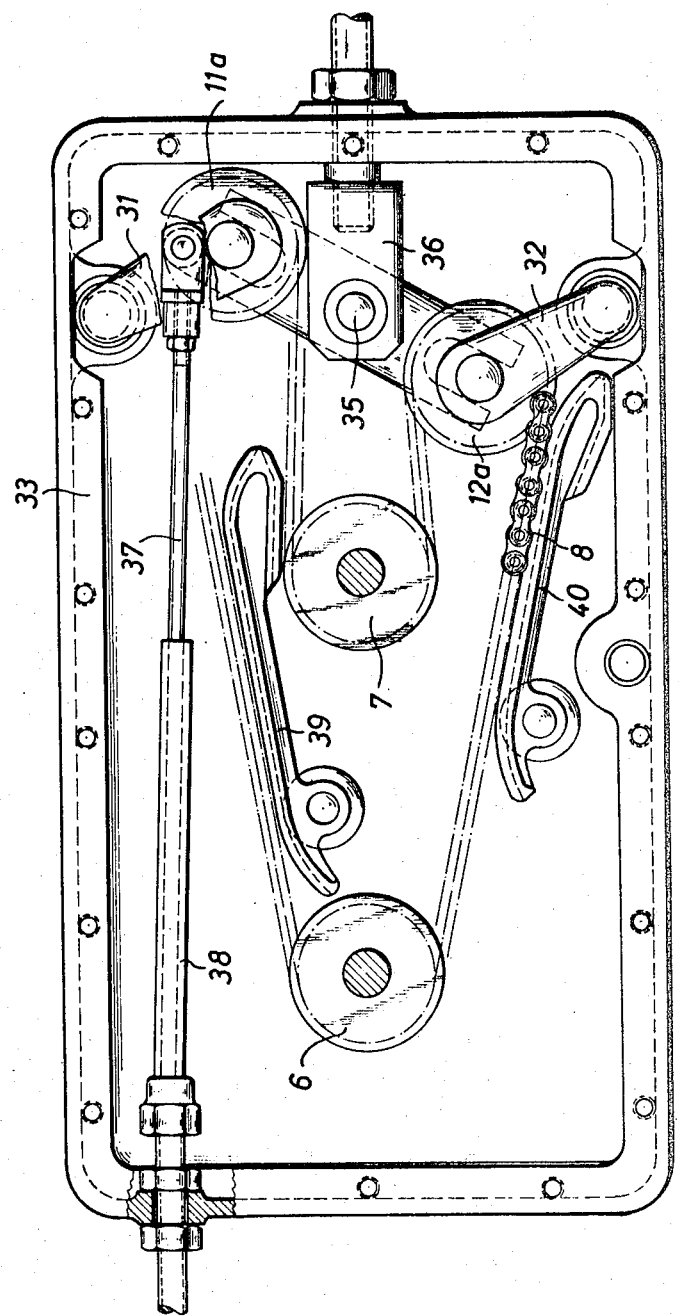
FIGURE 4 shows a side view of a mechanism which is designed in accordance with FIGURE 3.

According to the second embodiment of the invention, as illustrated in FIGURES 3 and 4, each of the two reversing wheels 11a and 12a is rotatably mounted on an arm 31 or 32, respectively, and both arms 31 and 32 are pivotable independently of each other in corresponding positions on the opposite sides of the housing 33. The particular position in which the reversing wheel 11a or 12a is located at any time depends upon the position to which a two-armed lever 34 is pivoted on an arm 34 about its central pivot 35. This pivot is mounted on an arm 36 which is adjustable in the direction of the plane of connection between the axes of sprocket wheels 6 and 7.

One end of the two-armed lever 34 is pivotably connected to an adjusting rod 37 which may be connected to a Bowden control cable or the like which extends through the wall of the housing 33 which may be closed by a cover.

Although the total length of the chain remains practically unaffected by the adjustments of the reversing wheels 11a and 12a to different positions, the apparatus as illustrated in FIGURE 4 is provided with two chain tighteners 39 and 40 for taking up a slack in the chain which may be due to its prolonged use.

The mechanism according to the invention is of a very simple construction and very sturdy and reliable in operation. It may be designed so as to take up very little space and is especially suitable for being used for a jarring machine. It permits the phase relation of the eccentric weight members to be infinitely varied within an angle of more than 200°.

Instead of being rotatably mounted on the pivotable arms 31 and 32 and to be slidably guided by the two-armed lever 34, the reversing wheels 11a and 12a may also be rotatably mounted on the two-armed lever 34. In this event, they may be slidably guided by the arms 31 and 32 or these arms may be omitted. Instead of mounting the reversing wheels 11a and 12a on short arms 31 and 32 each of which is pivotable about an axis which is located closely adjacent to the reversing wheel which it carries and at the outside of both reversing wheels, it is also possible, as shown in dot-and-dash lines in FIGURE 3, to mount the reversing wheels on longer arms each of which is pivotable about an axis which is located at the outside of the other reversing wheel and within a common plane which intersects the axis 35 of the two-armed lever.

Although our invention has been illustrated and described with reference to theh preferred embodiments thereof, we wish to have it understood that it is in no way limited to the details of such embodiments but is capable of numerous modifications within the scope of the appended claims.

Having thus fully disclosed our invention, what we claim is:

1. A mechanism for varying the phase relation of two revolving eccentric weights comprising a pair of drive wheels, two equal eccentric weight members each connected to one of said drive wheels so as to be rotated about the axis of said drive wheel, two reversing wheels located at both sides of the plane connecting the axes of said drive wheels and at a shorter distance from a first of said drive wheels than from the other drive wheel, all of said wheels having substantially parallel axes, a flexible endless power transmitting element connecting all of said wheels for driving said drive wheels and said eccentric weights thereon in opposite directions to each other, said element passing back and forth over said two reversing wheels and said first drive wheel intermediate said reversing wheels so that the opposite sides of said element form two parallel loops engaging upon the same side of both drive wheels opposite to the side upon which said element engages on said reversing wheels, means for driving said element, and adjusting means for moving said reversing wheels for equal distances in directions opposite to each other and symmetrically to said connecting plane.

2. A mechanism as defined in claim 1 having a housing enclosing all of said elements and adapted to be mounted in a jarring machine.

3. A mechanism as defined in claim 1, in which said adjusting means comprise a pair of racks, means for guiding said racks in a direction parallel to said connecting plane and at substantially equal distances from said plane, each of said reversing wheels being rotatably mounted on one of said racks, and a gear wheel rotatably mounted in a fixed position between said racks and meshing therewith for shifting said racks and said reversing wheels thereon equally in opposite direcaions, and means for turning said gear wheel.

4. A mechanism as defined in claim 1, further comprising means for moving the axis of each of said reversing wheels along an arc, said means comprising a two-armed lever having a central axis located substantially in alignment with said connecting plane, the axes of said reversing wheels being equally spaced from said axis of said lever at any position to which said lever is pivoted about its axis, said reversing wheels being connected to said lever, and the positions of said axes of said reversing wheels being dependent upon the positions to which said lever is pivoted, said adjusting means comprising a member for pivoting said lever to different positions about its axis.

5. A mechanism as defined in claim 4, further comprising means for adjusting the axis of said two-armed lever to different positions within an extension of said connecting plane.

6. A mechanism as defined in claim 4, in which said reversing wheels are rotatably mounted on said two-armed lever near the opposite ends thereof and at equal distances from the axis of said lever.

7. A mechanism as defined in claim 4, in which said means further comprise a pair of arms which are pivotable about axes both of which are disposed substantially within a plane intersecting the axis of said two-armed lever and extending at right angle to said connecting plane, said two-armed lever having slots near its ends, said reversing wheels having shafts slidable within said slots and rotatably mounted on said arms.

8. A mechanism as defined in claim 7, in which the axis of each of said reversing wheels is located between the axis of one of said arms carrying said wheel.

9. A mechanism as defined in claim 7, in which the axis of said two-armed lever is located between the axis of rotation of one of said reversing wheels on one of said arms and the pivot axis of said arm.

References Cited

UNITED STATES PATENTS

| 2,958,227 | 11/1960 | Peterson | 74—61 |
| 3,385,119 | 5/1968 | Berger | 74—61 |
| 3,277,697 | 10/1966 | Wittkuhns | 74—44 |

FOREIGN PATENTS 626,203  9/1927  France.

FRED C. MATTERN, JR., Primary Examiner

W. S. RATLIFF, JR., Assistant Examiner